UNITED STATES PATENT OFFICE.

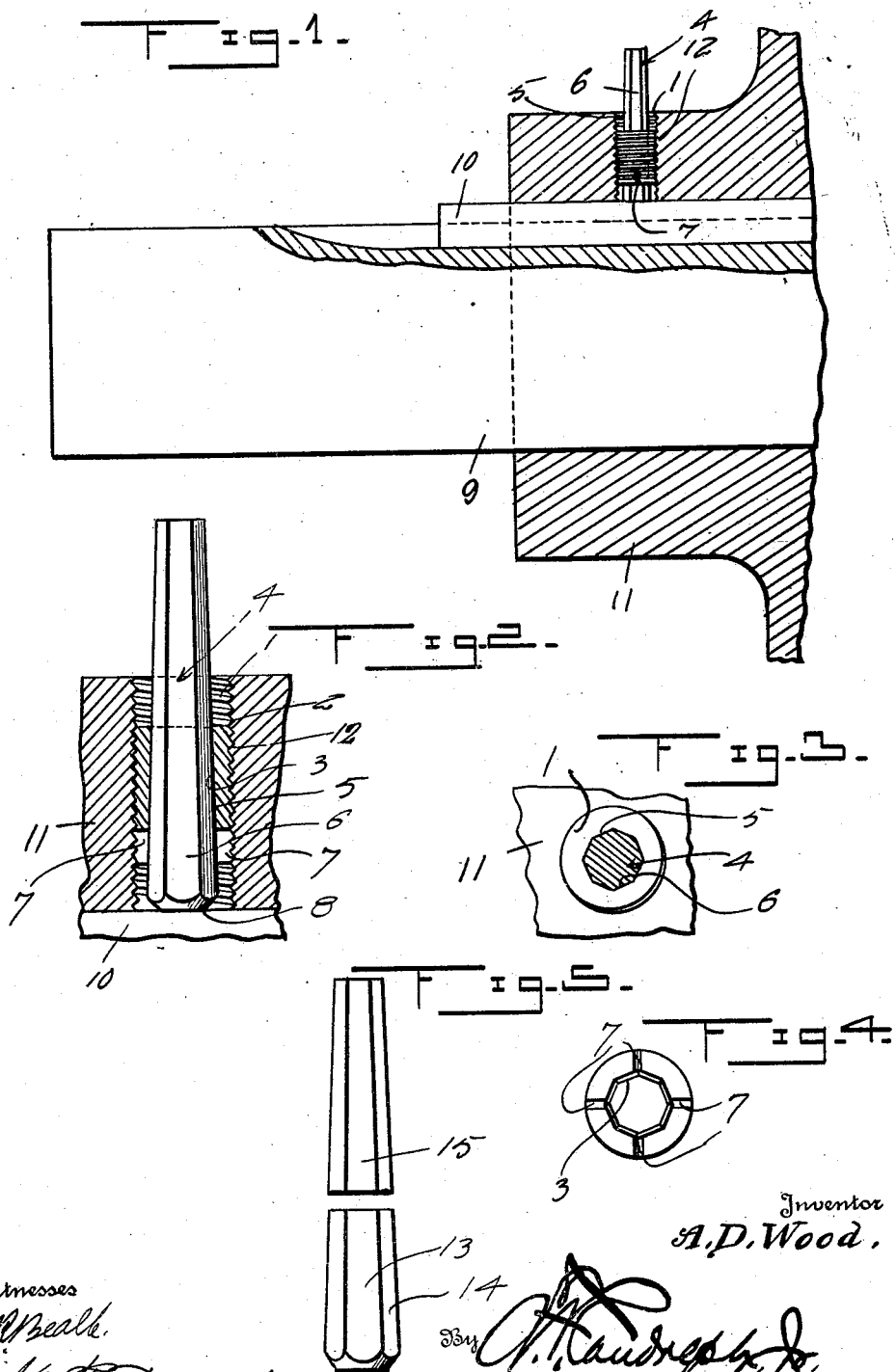

ALBERT D. WOOD, OF CANTON, NORTH CAROLINA.

SET-SCREW.

1,271,408.   Specification of Letters Patent.   Patented July 2, 1918.

Application filed June 19, 1917. Serial No. 175,608.

*To all whom it may concern:*

Be it known that I, ALBERT D. WOOD, a citizen of the United States, residing at Canton, in the county of Haywood and State of North Carolina, have invented certain new and useful Improvements in Set-Screws; and I do hereby declare the following to be a full, clear, and exact description of the invention, such as will enable others skilled in the art to which it appertains to make and use the same.

This invention relates to a set screw and has for one of its objects the provision of a device of this character, having means whereby the same may be locked in a turned down position, preventing the same from unscrewing.

Another object of this invention is the provision of an externally screwthreaded body having means therein adapted to spread said body after being turned down.

A further object of this invention is the provision of a body having a bore provided with active gripping faces adapted to receive a member having active gripping faces to coöperate with the active gripping faces of the bore, whereby upon rotating the member, the body will rotate therewith.

A further object of this invention is the provision of the inner end of the body slotted and adapted to be spread after being turned down by the member.

A still further object of this invention is the provision of a set screw of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a fragmentary vertical sectional view of a shaft having a collar, pulley or the like thereon and secured thereto by a set screw constructed in accordance with my invention, Fig. 2 is a fragmentary vertical enlarged sectional view of the same, Fig. 3 is a transverse sectional view, illustrating the connection between the member and the body, Fig. 4 is an end view of the set screw, Fig. 5 is a modified form of member.

Referring in detail to the drawings, the numeral 1 indicates a cylindrical body constructed from soft material, such as malleable metal and is externally screwthreaded as shown at 2. The member 1 is provided with a tapering bore 3 to receive a tapering member 4. The walls of the body have active engaging faces 5 adapted to engage the active engaging faces 6 upon the member to prevent said member from rotating with relation to the body. The inner end of the body is provided with pairs of oppositely disposed slots 7 to permit the inner end of the body to be spread when turned down. The inner end of the member 4 has a reduced end 8 for engagement with a shaft 9 or key 10 upon the shaft 9. When desiring to secure a pulley, collar or like member as shown at 11 in Fig. 1 to the shaft 9, they are usually secured thereon by means of the key 10 and in order to prevent the key 10 from moving in relation to the collar, pulley or the like and the shaft, a set screw is threaded into the pulley or collar, by way of an internally screwthreaded opening 12. In applying my invention to an article of the above stated character, the member 4 is first inserted through the body having its enlarged end disposed at a slight distance beyond the inner end of the body and the body is then threaded within the internally screwthreaded opening 12 by applying a socket or end wrench to the outer end of the member 4 and as the member 4 comes into engagement with the key 10 or the shaft 9, the inner end of the body is spread, locking the same against unscrewing from the opening 12. After the body has been tightly clamped, the member 4 may be hit with a suitable instrument, such as a hammer or the like, to cause the reduced end 8 to embed or bite into the key or shaft, thus preventing the collar, pulley or the like from slipping upon the shaft. After the blow on the member 4, it is again turned by a wrench or suitable tool for tightly clamping the body in position. In constructing the member 4, it is preferably desired that the same be formed of very hard steel so that when the same is struck with a hammer or like tool, it will bite into or mash the key or the shaft.

Referring to my modified form of member, as shown in Fig. 5, it consists of a member 13, which is provided with active engaging faces 14 adapted to coöperate with the faces of the body and is provided with the usual reduced end 8. The member 13 is inserted in the inner end of the body and a member 15 of similar construction is inserted within the outer end of the body and projects beyond the other end so as to receive a wrench or like tool for rotating the body, thus after the body has been tightly clamped, into its proper position, the member 15 may be removed leaving a socketed set screw, which may be flush with the surface of the pulley or collar upon the shaft.

While I have shown and described the preferred embodiment of my invention, it will be understood that minor changes in construction, combination and arrangement of parts may be made without departing from the spirit and scope of the invention as claimed.

Having thus described my invention, what I claim is:

A set screw comprising an externally screw threaded body adapted to be fitted into a hub and having a tapered bore provided with active engaging faces, said body having oppositely disposed slots in its inner end, and a tapered member having active engaging faces for coöperation with the faces of the body when said tapered member is inserted therein for rotating the body against a shaft carrying the hub, said tapered member adapted to be driven through the body to spread the same, and engage with the shaft to prevent rotation of the shaft with relation to the hub.

In testimony whereof I affix my signature in presence of two witnesses.

ALBERT D. WOOD.

Witnesses:
Geo. M. Trostel,
S. W. Patton.